United States Patent [19]
Wood et al.

[11] Patent Number: 5,761,676
[45] Date of Patent: Jun. 2, 1998

[54] METHOD OF REMOVING UNNEEDED DATA FROM DB2 LOGS AND OTHER DATA SETS HAVING DISPLACEMENT-DEPENDENT DATA

[75] Inventors: Gregory D. Wood; Jeffrey James Todd, both of Austin, Tex.

[73] Assignee: BMC Software, Inc., Houston, Tex.

[21] Appl. No.: 308,759

[22] Filed: Sep. 19, 1994

[51] Int. Cl.[6] .................................................. G06F 17/30
[52] U.S. Cl. .......................................................... 707/202
[58] Field of Search ................................ 395/600, 622, 395/621, 620, 616, 618; 707/202

[56] References Cited

U.S. PATENT DOCUMENTS

| | | | |
|---|---|---|---|
| 4,961,134 | 10/1990 | Crus et al. ............................ | 707/8 |
| 5,408,654 | 4/1995 | Barry ................................... | 707/101 |
| 5,430,871 | 7/1995 | Jamoussi et al. ..................... | 707/202 |
| 5,517,641 | 5/1996 | Barry et al. .......................... | 707/101 |

OTHER PUBLICATIONS

Elmasri R. et al., "Fundamentals of Database Systems" pp. 663–683, Dec. 1989.

*Primary Examiner*—Thomas G. Black
*Assistant Examiner*—Jack M. Choules
*Attorney, Agent, or Firm*—Arnold, White & Durkee

[57] ABSTRACT

In a data set containing displacement-dependent data (e.g., data identified by relative byte address), such as a DB2 log data set, data that is determined to be unneeded or otherwise removable is overwritten with a compressible binary pattern such as a sequence of binary zeros. The resulting substitute data set can be compressed to occupy less storage space and require less time for data recovery.

6 Claims, 4 Drawing Sheets

METHOD OF REMOVING UNNEEDED DATA FROM DB2 LOGS AND OTHER DATA SETS HAVING DISPLACEMENT-DEPENDENT DATA

BACKGROUND OF THE INVENTION

The invention relates to a method for removing unneeded data in DB2 log data sets. With the benefit of this disclosure, those of ordinary skill will appreciate that the method has a broader applicability: it can likewise be used to remove unneeded data in other data sets that use a relative byte address (RBA) identifier for records or other data items, and from which the unneeded data would thus normally be unremovable.

FIG. 1 illustrates the context of the invention using a greatly simplified view of a hypothetical DB2 log record:

---

100 Storage medium: An original data set 102 is stored on a storage medium 100 such as a magnetic tape or a direct-access storage device (DASD). In the context of this invention, a defining feature of the original data set 102 is that data items in the original data set are identified by their respective positions within that data set.

105 The original data set 102 comprises a series of records 105 such as a series of DB2 log records. In such a DB2 log data set, each data record 105 is identified by its respective relative byte address (RBA).

110 Header: In the illustrative example, each DB2 log record 105 in- 115 cludes a header 110 and a data portion 115. The header 110 includes fields indicating the length of the record 105, the record type and subtype, and other information not shown. The data portion 115 may include an object identifier (object ID) 120.

---

In many cases, a great deal of information in the data portion 115 of the DB2 log record 105 is unneeded for data recovery, yet takes up considerable storage space in the storage medium 100. Because the data portion 115 of a record 105 is identified only by the relative byte address of the record 105, this unneeded data cannot be removed from the log record without compromising the integrity of the RBAs of data that follows the removed data.

SUMMARY OF THE INVENTION

In an electronic, magnetic, optical, or similar data structure such as a DB2 log data set that conforms to the IBM MVS data set format requirements (referred to simply as a "data set") and that contains displacement-dependent data, e.g., data that is identified by relative byte address, data that is determined to be unneeded or otherwise removable is overwritten with a compressible binary pattern such as a sequence of binary zeros. The resulting substitute data set can be compressed to occupy less storage space and require less time for data recovery.

DETAILED DESCRIPTION OF SPECIFIC EMBODIMENTS

One illustrative embodiment of the invention is described below as it might be implemented using a computer program to control a general-purpose programmable computer. In the interest of clarity, not all features of an actual implementation are described in this specification. It will of course be appreciated that in the development of any such actual implementation (as in any software development project), numerous implementation-specific decisions must be made to achieve the developers' specific goals, such as compliance with system- and business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

4.1 Overview

Figure 1:
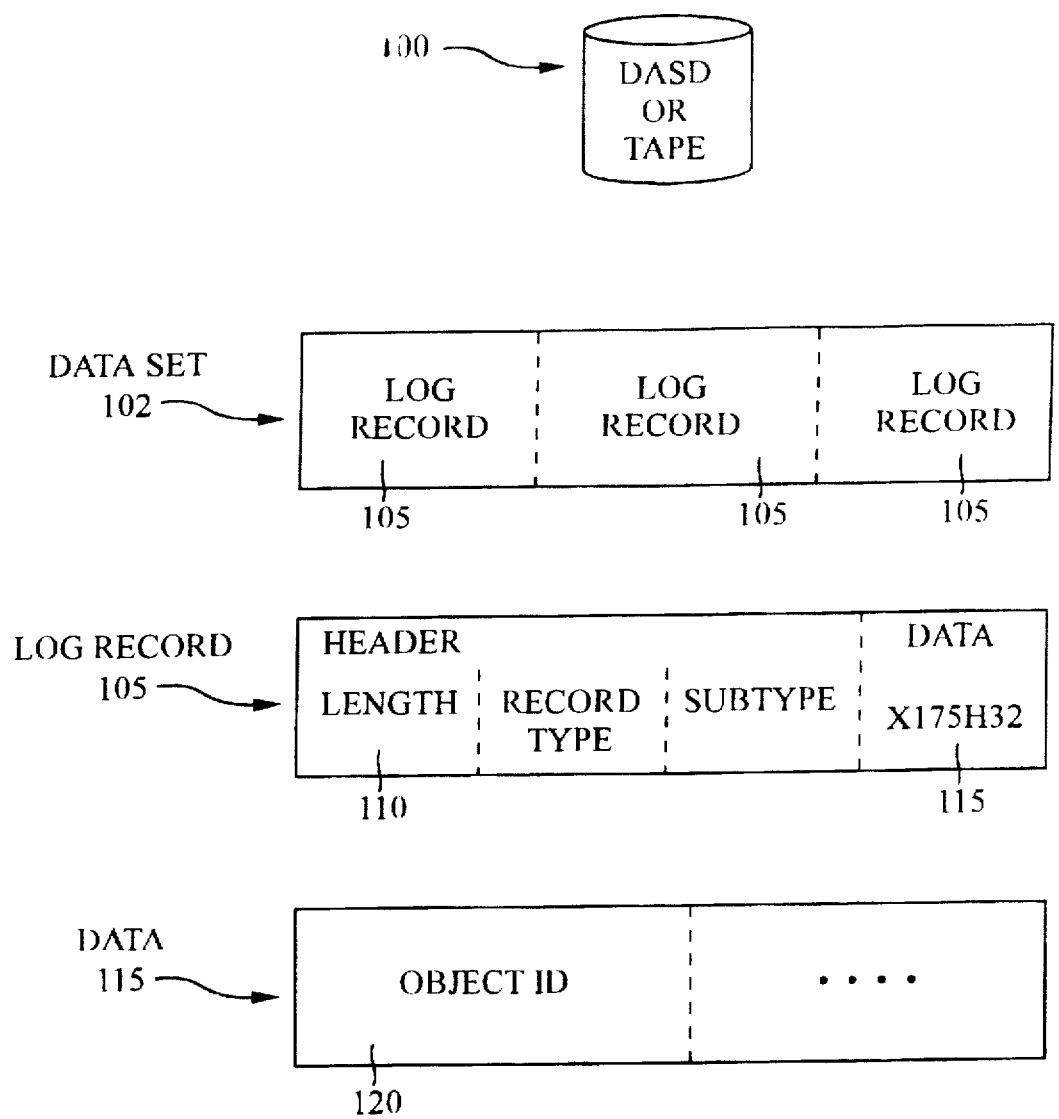
FIG. 1 is a block-diagram view of a hypothetical DB2 log data set.
Figure 2:
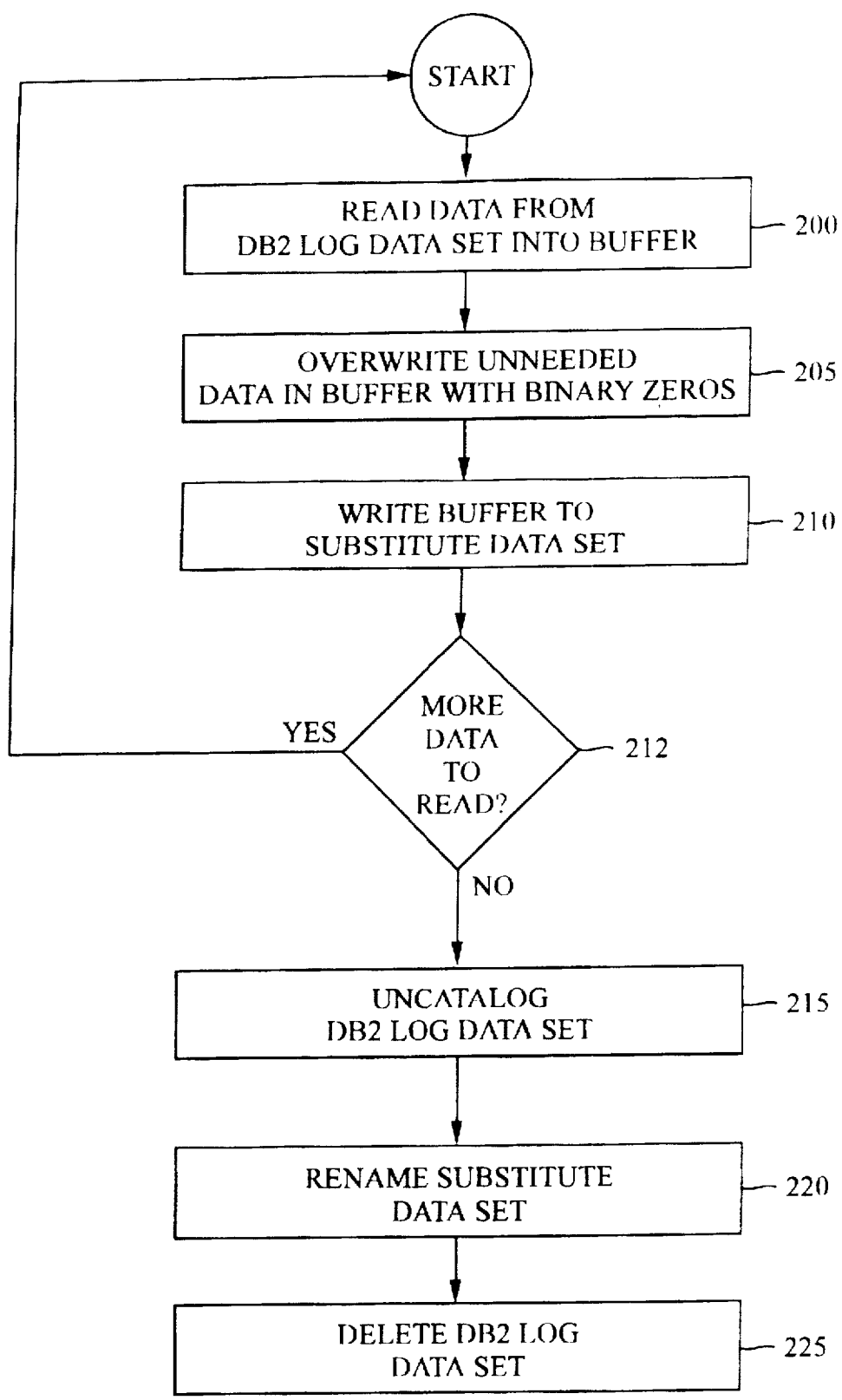
FIG. 2 is a flow chart of a method in accordance with the invention.

FIG. 2 shows a high-level overview of an improved method, executed by a computer program, for removing selected data from a DB2 log data set or other data set in which relative byte address is used to identify data items:

---

200 A record is read from the original data set 102 into a working copy, e.g., in a buffer. The record is examined for possible compressibility as discussed in more detail in connection with FIG. 3 below.

205 In the working copy, data in the record 105 that is determined to be unneeded or otherwise removable (see FIG. 3) is overwritten with a compressible binary pattern such as a sequence of binary zeros. It will be appreciated by those of ordinary skill having the benefit of this disclosure that any suitable compressible binary pattern may be used, e.g., space characters, repeating character strings, and the like.

Figure 4:
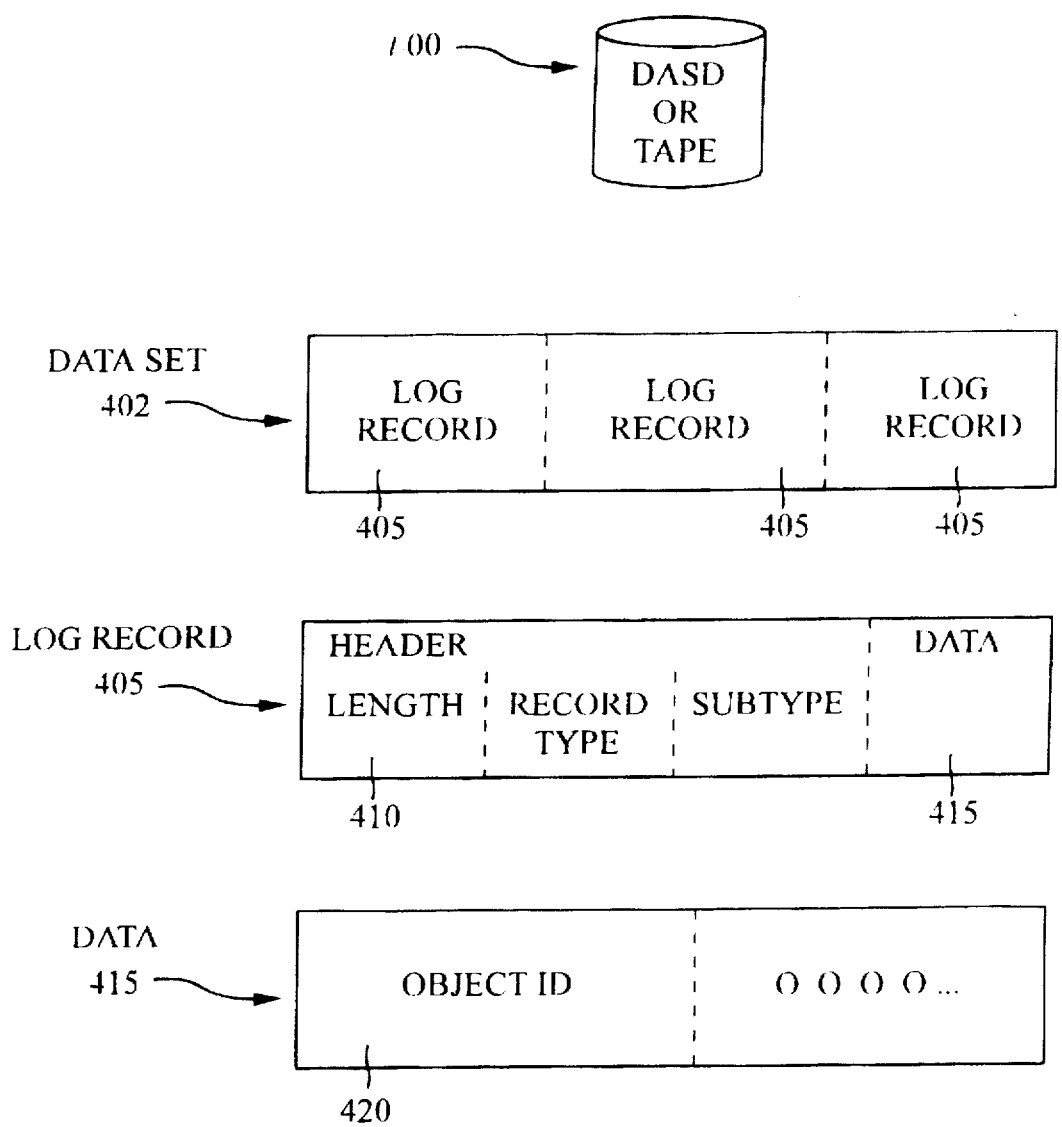
FIG. 4 is a block-diagram view of a substitute data set resulting from processing the DB2 log data set using the method illustrated in FIGS. 2 and 3.

210 The working copy, possibly modified in step 205, is written to a new data set 402 illustrated in FIG. 4, referred to as a substitute data set. The substitute data set may be compressed, e.g., via a data-compression algorithm such as repeat-to-address, Lev-Zimpel, or the like.

212 If more data records 105 remain to be processed, steps 200 through 210 are repeated.

215 When all desired data records 105 have been processed, the 220 substitute data set 402 is substituted for the original data set 100.

225 This may be achieved, for example, by uncataloging the original data set 100; renaming the substitute data set 402 with the same data set name as the original data set 100; and deleting the original data set 100, all in accordance with standard MVS procedures.

---

The method illustrated in FIG. 2 can be performed on an arbitrary DB2 log data set. It can, for example, be invoked just as DB2 has completed an archive-log process to archive an active log data set, so that a compressed substitute data set is stored in place of the original archived data set.

4.2 Identifying and Removing Removable Data

Figure 3:
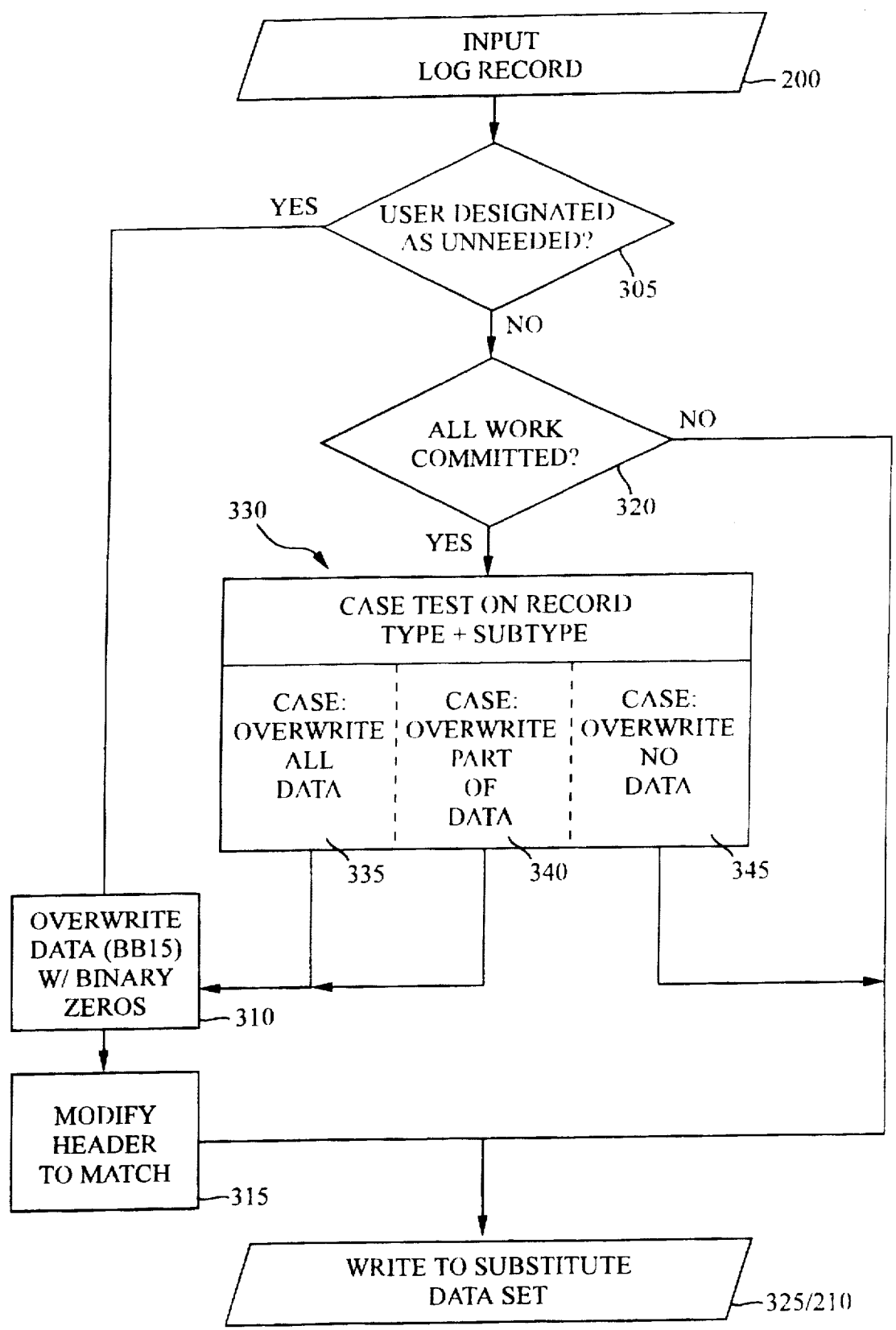
FIG. 3 is an expanded-view flow chart of specific method steps in the method shown in FIG. 2.

FIG. 3 shows, as part of the step 205 of overwriting unneeded data, an illustrative method of identifying records 105 containing data 115 that can be removed from the original data set 102. Again, for illustrative purposes the record 105 is assumed to be a DB2 log record, in a DB2 log data set 102 that has just been archived by DB2.

---

305 A test is made to determine whether the DB2 log record 105 is for 310 a DB2 object that has been designated by the user as unneeded and 315 therefore removable. (Such a designation may be made conventionally via, e.g., a job control card, a command-line switch, a parameter file, or other control statement in executing the computer program used to perform the method of the invention.) If so, the working copy of the data 115 of that log record is overwritten with binary zeros. If necessary, the header of the DB2 log record 105 is updated to reflect the change to the data 115 so that the resulting substitute data set will conform to standard DB2 conventions.

320 On the other hand, if the DB2 log record 105 was not designated as unneeded, a recent DB2 checkpoint is examined to determine whether the log record represents a data transaction that has not yet been committed. (If the transaction has not yet been committed, certain data in the log record 105 might be needed in a data-recovery process and thus would not yet be removable.) The checkpoint examined is the one most recently created by DB2 as of the time that the archive data set 102 is created.

325 If the log record 105 does represent an uncommitted transaction, the data 115 for that log record is not overwritten with binary zeros, and instead the log record is copied directly to the substitute data set 402.

330 If the log record 105 does represents a committed transaction, a
335 two- or three-way test is made to determine the removability of the
340 data 115 for that record. The header of the record 105 may indicate
345 that the record is of a type and/or subtype which can always be removed safely (335), in which case the data 115 for that record is overwritten at steps 310 and 315 and the record is copied to the substitute data set 402 at step 325/210. Alternatively, the header may indicate that the record can never be removed safely (340), in which case the data 115 for that record is not overwritten with binary zeros, and instead the record is copied to the substitute data set 402 at step 325/210. Finally, if only part of the data 115 of the record 105 can be removed (345), then that part of the data is overwritten but the remaining data is left intact.

A list of some record types and subtypes that normally can be removed safely is set out in Table 1 below; other types and subtypes may also be removable in particular applications:

TABLE 1

Removable Record Types and Subtypes

| | |
|---|---|
| 00020002= | DATASET CLOSE |
| 00020003= | PAGESET CLOSE |
| 00020007= | PAGESET WRITE |
| 00100005= | BEGIN BACKWARD RECOVERY |
| 0020000C= | PHASE 1 TO 2 |
| 00200001= | BEGIN UR |
| 00200002= | BEGIN COMMIT1 |
| 00200010= | END COMMIT2 |
| 00200020= | BEGIN ABORT |
| 00200040= | END ABORT |
| 00200088= | END REDO |
| 0200000D= | UNDO-INVALIDATE OBJECT |
| 02000005= | UNDO-INDEX UPDATE |
| 02000009= | UNDO-DBD VIRTUAL MEMORY COPY |
| 0400000A= | REDO-EXCLUSIVE LOCK |
| 06000004= | UNDO REDO-UPDATE INDEX/SEGMENTED SPACE MAP PAGE |
| 06000005= | UNDO REDO-INDEX UPDATE |
| 08000000= | ARCHIVE LOG |
| 21000007= | CHECKPOINT-DBA TABLE-CHECKPOINT |
| 22000007= | UNDO-DBA TABLE-CHECKPOINT |
| 22000014= | UNDO |
| 2400000A= | REDO-EXCLUSIVE LOCK |

4.3 Decompressing Compressed Data Sets

In the special case of DB2 data sets, it will be apparent to those of ordinary skill having the benefit of this disclosure that if DB2 issues a DASD read-type request specifying a data record 105 at a particular relative byte address, the substitute data set 402 must be decompressed if it was compressed prior to be stored. In one embodiment, the entire data set can be decompressed and then recompressed when the data request from DB2 has been fulfilled. Alternatively, a table of relative byte addresses can be maintained. That table may show, for a given record 105/405, both the record's RBA in the original data set 102 and its RBA in the substitute data set 402. A data request from DB2 can then be fulfilled by retrieving and decompressing only the needed data record 405 and not the entire compressed substitute data set 402.

4.4 Some Advantages of the Invention

Those of ordinary skill having the benefit of this disclosure will recognize that compression of a DB2 log data set provides provides significant performance benefits. Less storage space is required to maintain the log data set. Moreover, recovery of data from a log data set is considerably speeded up because unneeded data need not be read to obtain the desired data; this benefit is especially significant when log data sets are archived to magnetic tape (which must be fast-forwarded or rewound to obtain desired data) instead of disk storage or other direct-access storage.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. A method of compressing DB2 log data set in a computer system, said DB2 log data set including data recovery data identified by its respective position within said log data set and having a data set name, comprising:

(a) copying data from said data set into temporary storage, referred to as a working copy;

(b) overwriting a portion of said working copy that is not needed for data recovery, referred to as removable data, with a sequence of binary zeros;

(c) writing data in said working copy in a loss-less, compressed form to a physical data set, referred to as a compressed data set;

(d) if all of said data recovery data has not been written to said compressed data set, then repeating steps (a) through (c); and (e) uncataloging said DB2 log data set;

(f) renaming said compressed data set with said data set name; and (g) deleting said DB2 log data set.

2. A method of compressing a DB2 log data set in a computer system, said DB2 log data set including data recovery data identified by its respective position within said log data set, comprising:

(a) copying data from said data set into temporary storage, referred to as a working copy;

(b) overwriting a portion of said working copy that is not needed for data recovery, referred to as removable data, with a compressible binary pattern;

(c) writing data in said working copy in a loss-less compressed form to a physical data set, referred to as a compressed data set;

(d) if all of said data recovery data has not been written to said compressed data set, then repeating steps (a) through (c); and (e) substituting said compressed data set for said DB2 log data set.

3. The method of claim 2, wherein said compressible binary pattern is a sequence of binary zeros.

4. An improved method of storing data in a computer system in a data set in which data items in said data set are identified by their respective position within said data set, said method comprising:

(a) reading said data set into a buffer;

(b) overwriting a removable portion of data in said buffer, referred to as removable data, with a compressible binary pattern;

(c) writing the data in said buffer to a physical data set, referred, to as a substitute data set; and (d) substituting said substitute data set for said data set;
wherein writing data in said buffer to a physical data set includes loss-less compression of said data.

5. A computer programmed to execute the operations recited in a specified one of claims 1, 2, 3, and 4.

6. A machine-readable computer program storage device having encoded therein a program of instructions for performing the operations recited in a specified one of claims 1, 2, 3, and 4.

* * * * *